United States Patent [19]

Mikami

[11] Patent Number: 5,117,606
[45] Date of Patent: Jun. 2, 1992

[54] STRUCTURAL MEMBER

[75] Inventor: Izumi Mikami, Amagasaki, Japan

[73] Assignee: Mitsubishi Denki Kabushiki Kaisha, Tokyo, Japan

[21] Appl. No.: 644,818

[22] Filed: Jan. 23, 1991

[30] Foreign Application Priority Data

Jan. 24, 1990 [JP] Japan .................................. 1-15608

[51] Int. Cl.$^5$ .................................................. E04C 3/30
[52] U.S. Cl. ...................................... 52/727; 244/158 A
[58] Field of Search .................... 138/148, 149, 150; 244/158 A

[56] References Cited

U.S. PATENT DOCUMENTS

| | | | |
|---|---|---|---|
| 4,307,756 | 12/1981 | Voigt | 138/149 |
| 4,492,089 | 1/1985 | Rohner | 138/149 |
| 4,659,601 | 4/1987 | Elliot | 138/149 |
| 4,919,366 | 4/1990 | Cormier | 244/158 R |
| 4,925,134 | 5/1990 | Keller | 244/158 A |

Primary Examiner—David A. Scherbel
Assistant Examiner—Creighton Smith
Attorney, Agent, or Firm—Rothwell, Figg, Ernst & Kurz

[57] ABSTRACT

A structural member for use in a telescope or the like comprises an inner member of a structural material imparting rigidity and strength, an intermediate layer of a heat-insulating material, and an outer layer having a low emissivity and low heat capacity. The outer layer is able to quickly follow changes in outside air temperature, while the intermediate layer of insulating material reduces the propagation of heat between the outer layer and the inner structural material, thereby avoiding rapid temperature variation of the structural material.

12 Claims, 4 Drawing Sheets

STRUCTURAL MEMBER

FIELD OF THE INVENTION

The invention relates to an improvement in a structural member used in telescope tube assembly or mount structure of, for example, an optical or infrared telescope apparatus or the like.

BACKGROUND OF THE INVENTION

FIG. 5 and FIG. 6 are an oblique diagram and a sectional diagram, respectively, showing an example of an overall arrangement of a reflective large-aperture optical or infrared telescope apparatus. In the figures, 1 is a parallel light beam, having arrived from an observed celestial body; 2 is a primary reflective mirror, which collects the light beam; 3 is a secondary reflective mirror; and 4 is a Cassegrain focal point, at which an observation device is placed. 5 is a telescope tube assembly which supports secondary reflective mirror 3 and primary reflective mirror 2 and which swivels around axis $E_1$. The telescope tube assembly 5 is comprised of: top ring 5b, which supports secondary reflective mirror 3; mirror cell 5a, which supports primary reflective mirror 2; and center section 5e, which supports these through structural members 5d and 5c. 6 is a mount structure which has a function of rotating telescope tube assembly 5 around axis $E_1$ and which itself freely rotates around axis $A_z$ while holding telescope tube assembly 5.

FIG. 3 and FIG. 4 are sectional diagrams showing details of structural members 5c and 5d of mirror frame 5; a structural member provides rigidity and strength to support the weight of top ring 5b and mirror cell 5a and is formed, for example, of a steel tube $5c_1$ or $5d_1$ coated on the outside with rust-preventing agent $5c_2$ or $5d_2$. In place of steel tube $5c_1$ or $5d_1$, some structural members utilize tubes $5'c_1$ or $5'd_1$, which are made of a material having a low coefficient of thermal expansion, such as CFRP (Carbon Fiber Reinforced Plastic) or Invar, as shown in FIG. 3.

When a celestial body is to be observed, the observation slit (not shown) in the dome is opened, the telescope apparatus is set to point in the direction of that celestial body by rotation about the $E_1$ axis of the mirror mount and furthermore by rotation to change the angle $A_z$. Observation is made at the position of Cassegrain focal point 4, where an observation device, for example, a photographic dry plate, is accurately positioned.

When the dome observation slit is opened, the temperature of the air around the telescope apparatus varies depending on the temperature change of the outer air due to air exchanged through the observation slit. Furthermore, in a case of optical or infrared telescope, observation is made almost always at night; the telescope is in an environment in which radiative cooling from the cold upper layers of the atmosphere begins instantly when the observation slit is opened. Consequently, structural members 5c and 5d are exposed, simultaneous to the start of observation, to a fluctuating ambient temperature and radiative cooling from the cold air of the upper atmosphere.

As the prior-art structural members had a structure shown in FIG. 3 or FIG. 4, there were the following problems.

(1) Heat exchange with the outer air is performed through convection; however, since the heat capacity of the structural members overall is large, the structural member is slow in following the outside air (ambient) temperature variations; and there tends to occur a difference in temperature from the ambient air. When such a difference in temperature occurs, air becomes turbulent due to convection; and, since the refractive index of light becomes non-uniform, observed light is disturbed. This phenomenon is called seeing deterioration.

(2) Since the emissivity of rust-preventing agent coated on the surface of the structural member is high, the temperature of the structural member is strongly affected by radiative cooling from the upper atmosphere and becomes less than ambient air temperature; a temperature difference occurs; and, in this case as well, seeing deterioration occurs.

(3) The temperature of a structural member varies during observation; therefore, thermal expansion or contraction occurs in the length direction; and because of this the distance between primary reflective mirror 2 and secondary reflective mirror 3 varies, the position of Cassegrain focal point 4 varies, and observation is adversely affected. Also, although this defect can be eliminated by the use of a low thermal expansion material for the structural member material as shown in FIG. 3, this is expensive, and furthermore problem at (1) and (2) above still remain.

SUMMARY OF THE INVENTION

The invention was devised to solve problems described above, and its object is to provide a structural member in which the occurrence of thermal expansion and contraction can be eliminated while the temperature of the surface of the structural member can be made to quickly follow the ambient air temperature, without the use of expensive materials.

A structural member according to this invention is comprised of an inner member, an intermediate layer formed over the inner member, and an outer layer formed over the intermediate layer. The inner member is formed to provide rigidity and strength. The intermediate layer is formed of a heat-insulating material. The outer layer is formed of a material having a low emissivity and a low heat capacity.

With the invention, the outer layer of a material having a low emissivity and a low heat capacity is able to quickly follow changes in outside air temperature, while the intermediate layer of an insulating material reduces the propagation of heat between the outer material layer and the inner structural member, thereby avoiding rapid temperature variation of the inner member material.

DETAILED DESCRIPTION OF THE PREFERRED EMBODIMENTS

An embodiment of the invention will now be described with reference to the drawings.

Figure 1:
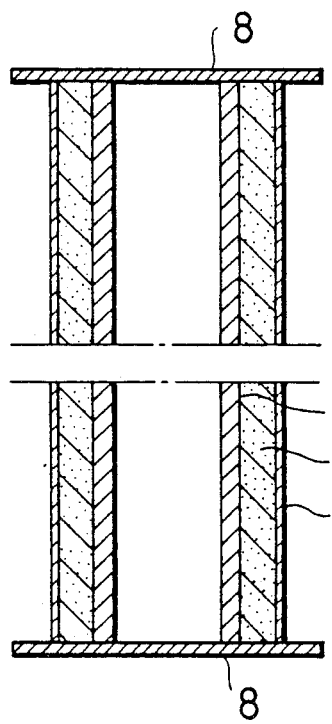
FIG. 1 is a sectional diagram showing a structural member of an embodiment of the invention.

FIG. 1 is a longitudinal sectional view of a structural member of an embodiment of the invention. As shown, the structural member is generally cylindrical, and comprises an inner member 7a, an intermediate layer 7b formed over the inner member 7a, and an outer layer 7c formed over the intermediate layer 7b.

The inner member 7a is in the form of a hollow cylinder, with the ends of the inner member 7a being closed by sealing members, such as flanges 8, so that the space inside the hollow inner member 7a and the space outside of the structural member are not in fluid communication with each other.

The inner member 7a is formed of a structural material which imparts rigidity and strength. It may for example formed of as a steel tube, which is often used in the conventional structural material. As an example, the steel tube has an outer diameter of 300 mm, and its thickness is 16 mm.

The intermediate layer 7b is formed of a heat-insulating material. As an example, the intermediate layer 7b has a thickness of 50 mm.

The outer cylindrical layer 7c is formed of a thin metallic sheet, having a low emissivity and a low heat capacity. It may for example comprise an aluminum cylinder. As an example, the thickness of the aluminum cylinder is 1 mm. It may alternatively comprise a metal cylinder plated, on its outer surface, with gold or silver. It may still alternatively comprises a plating layer of gold or silver plated on a plastic material. In such a case, the plastic material may also used as an intermediate insulating layer.

In the case of aluminum, the emissivity (ratio of the radiation from the surface of the material in question to the radiation of a perfect blackbody at the same temperature) $\eta$ is about 0.1 to 0.03. In the case of gold plating, the emissivity $\eta$ is about 0.02 to 0.08. In the case of silver plating, the emissivity $\eta$ is about 0.03 to 0.09. These values of the emissivity is substantially lower than those (0.6 to 0.8) of rust-preventing agent (containing titanium oxide) which are often coated over the conventional structural member.

The flanges 8 are welded to the outer member 7c for the sealing of the space inside the inner member 7a. The flanges 8 are used for connection of the structural member with other structural members or mounts, and for this purpose they have holes, not shown, for insertion of bolts.

Let us assume that this structural member 7 is used in a telescope in the same way as described in the BACKGROUND OF THE INVENTION, and the structural member is subjected to radiative cooling.

Since, however, the outer layer 7c has a low emissivity, decrease in temperature of the outer layer due to thermal radiation to cold air in the upper atmosphere is restricted. On the other hand, because the heat capacity of the outer layer 7c is low, the temperature of the outer layer 7c quickly follows, by heat exchange through convection, changes in outside air temperature.

The insulating material 7b has the function of thermally insulating structural material 7a, which has a large internal heat capacity (is heavy), and the outer layer 7c, which has a low heat capacity, and making heat propagation difficult; thereby, even should the temperature of outer layer 7c fluctuate and follow the outer air temperature, inner member 7a will tend to stay at a constant temperature or its temperature varies only slowly. Consequently, since the outer layer 7c of the structural member changes in temperature in accordance with outside air temperature, seeing deterioration, which is caused by a difference in structural member temperature and outside temperature, does not occur; and since the temperature of the structural material or the inner member 7a, which imparts rigidity and strength, varies only slowly, thermal expansion/contraction is less liable to occur; therefore optical aberration due to a change in the distance between the secondary reflective mirror and primary reflective mirror is less liable to occur.

Figure 2:
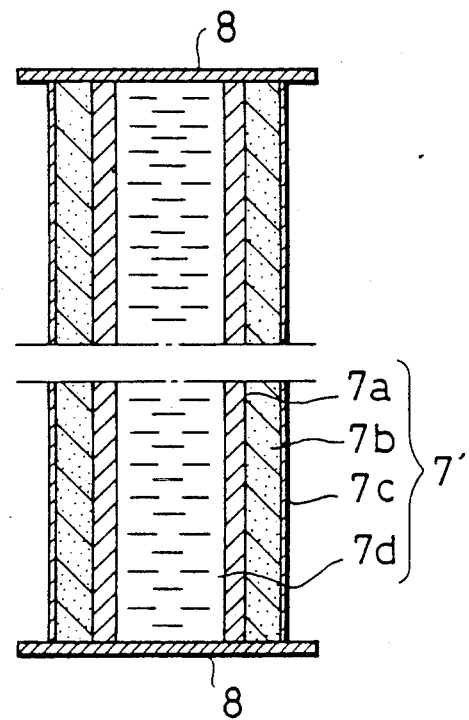
FIG. 2 is a sectional diagram showing another embodiment of the invention.
Figure 3:
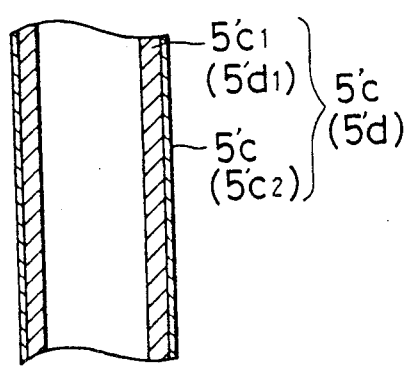
FIGS. 3 and 4 are selectional diagrams showing prior-art structural members.
Figure 4:
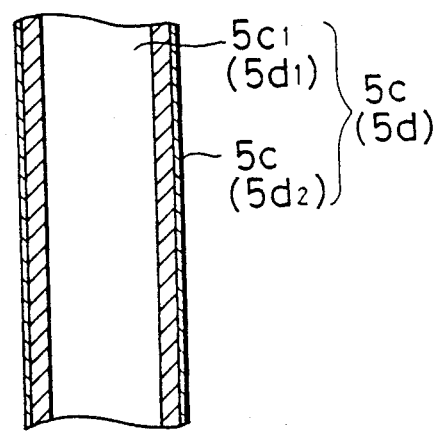
Figure 5:
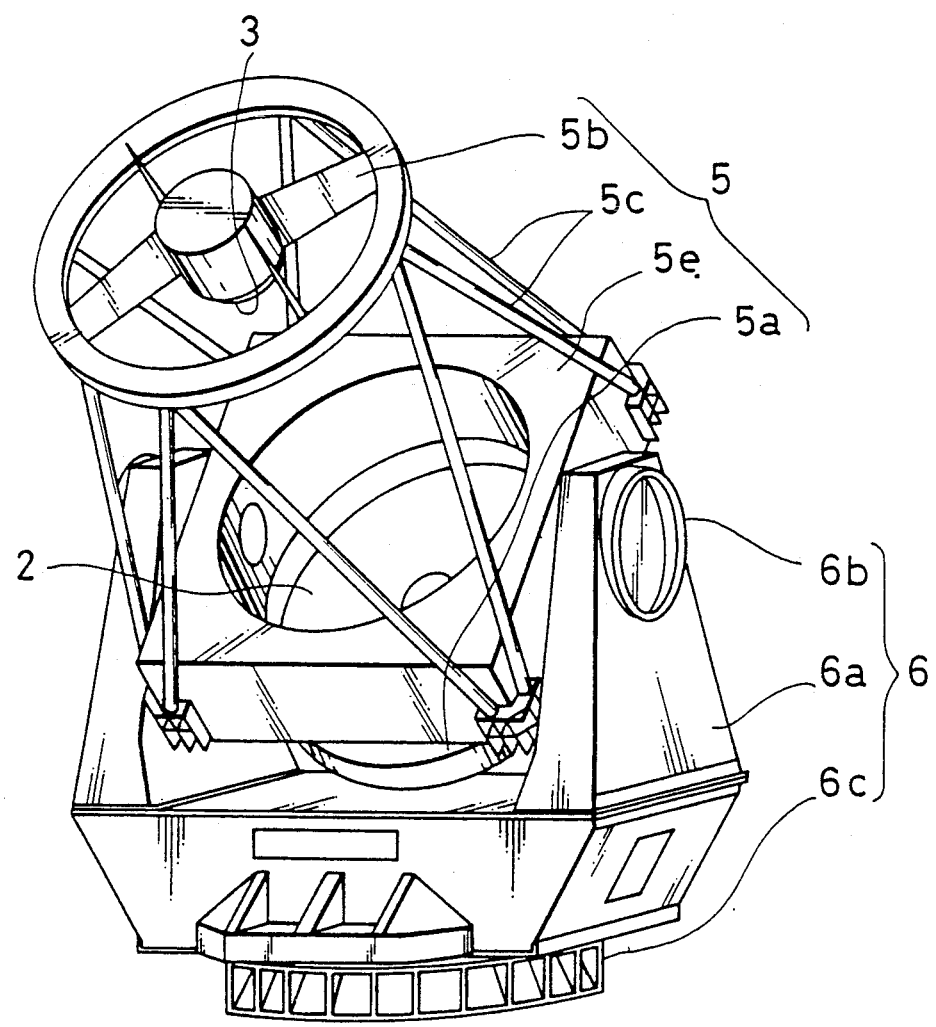
FIGS. 5 and 6 are an oblique diagram and a sectional diagram showing an example of the overall structure of a reflective large-aperture optical or infrared telescope apparatus.
Figure 6:
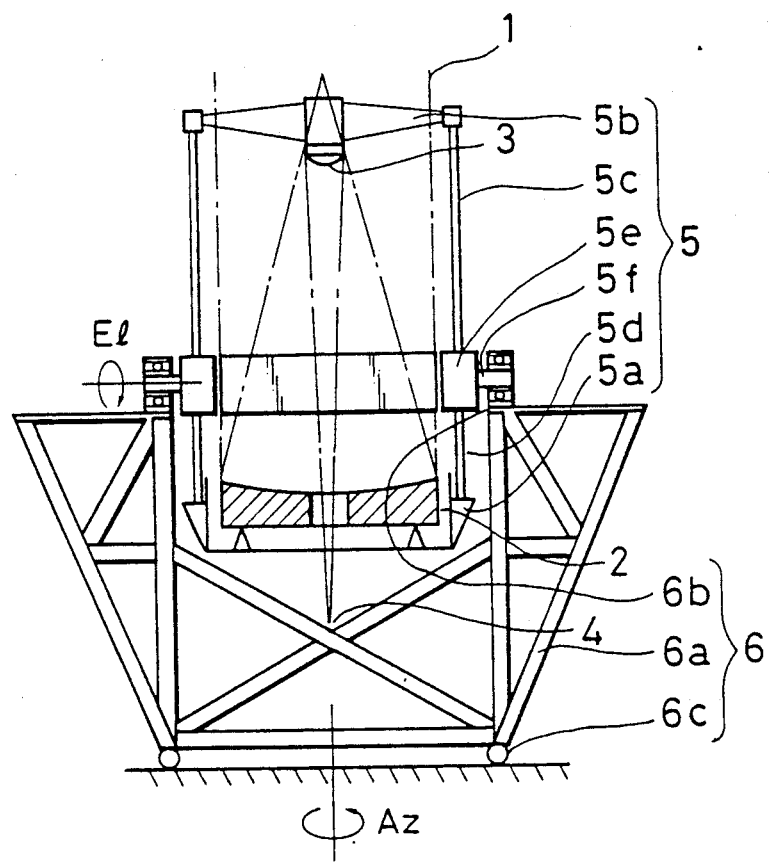

In the above embodiment, the inner member 7a is a hollow cylinder and the space inside is filled with air. However, as shown in FIG. 2, the space inside the hollow inner member 7a may alternatively be filled with liquid or solid 7d with a large specific heat. In such a case, the liquid or the solid increases the apparent heat capacity of the inner member. In other words, the heat capacity of the combination of the inner member and the liquid or solid filling the space inside the inner member is greater.

It should be noted that there is no need to circulate liquid contained in the space inside the inner cylinder 7a with a circulator or the like. That is, what is essential is to avoid quick temperature variation of the inner member 7a.

The inner member 7a may still alternatively be formed of a rod-shaped member.

In the embodiment described, the structural member is said to be "cylindrical." The term "cylindrical" should be interpreted to cover not only circular-cylinder but cylinders of any other shapes, such as polygon-shape, channels-shape, and angle-shape. It should also be interpreted to cover not only hollow cylinder but also rod.

Furthermore, in the above embodiment, the structural members are utilized in a telescope tube assembly, which is along a path of light from the celestial body to be observed, but they may also be used as mount component, in which case a similar effect is achieved. The structural member according to the invention can be used not only in optical or infrared telescopes as described, but also in laser emission devices, laser communication devices, and other similar devices, which are subjected to radiative cooling or heating, changes in the temperature of the ambient temperature and are required to undergo limited thermal expansion or contraction during use and to prevent the seeing deterioration.

What is claimed is:

1. A structural member for devices which are subjected to radiative cooling or heating, changes in ambient temperature and are required to undergo limited thermal expansion or contraction during use in order to prevent visual distortion, the member comprising a substantially cylindrical or rod-shaped inner layer of a structural material that imparts rigidity and strength, an intermediate layer formed over the inner layer and formed of a heat-insulating material, and an outer layer formed over the intermediate layer and formed of a material having a relatively low emissivity and a relatively low heat capacity, whereby the temperature of the outer layer quickly follows the ambient temperature, and the temperature of the inner layer varies only slowly.

2. A structural member according to claim 1, wherein the inner layer is a hollow cylinder, said structural member further comprising sealing members provided on both ends of inner layer to close said both ends so that space inside the inner layer is not in fluid communication with the space outside of the structural member.

3. A structural member according to claim 1, wherein the emissivity of the outer layer is within the range of about 0.02 to about 0.1.

4. A structural member according to claim 1, wherein the outer layer is formed of an aluminum layer or formed of metal or plastic plated with gold or silver.

5. A structural member according to claim 1, wherein the heat capacity of the outer layer is lower than the inner layer.

6. A structural member according to claim 1, wherein the outer layer comprises an insulating layer which is adjacent to the intermediate layer.

7. A structural member for a telescope assembly wherein the member comprises a substantially cylindrical or rod-shaped inner layer of a structural material that imparts rigidity and strength, an intermediate layer formed over the inner layer and formed of a heat-insulating material, and an outer layer formed over the intermediate layer and formed of a material having a relatively low emissivity and a relatively low heat capacity, whereby the temperature of the outer layer quickly follows the ambient temperature, and the temperature of the inner layer varies only slowly.

8. A structural member according to claim 7, wherein the inner layer is a hollow cylinder, said structural member further comprising sealing members provided on both ends of the inner layer to close said both ends so that space inside the inner layer is not in fluid communication with the space outside the structural member.

9. A structural member according to claim 7, wherein the emissivity of the outer layer is within the range of about 0.02 to about 0.1.

10. A structural member according to claim 7, wherein the outer layer is formed of an aluminum layer or formed of metal or plastic plated with gold or silver.

11. A structural member according to claim 7, wherein the heat capacity of the outer layer is lower than the inner layer.

12. A structural member according to claim 7, wherein the outer layer comprises an insulating layer adjacent to the intermediate layer.

* * * * *